United States Patent Office 3,573,214
Patented Mar. 30, 1971

3,573,214
PROCESS FOR PREPARING STABLE DIMETHYL SULFOXIDE-HYDROGEN FLUORIDE MIXTURE
Janos Kollonitsch, Westfield, N.J., assignor to Merck & Co., Inc., Rahway, N.J.
No Drawing. Original application Sept. 12, 1966, Ser. No. 578,518, now Patent No. 3,471,512, dated Oct. 7, 1969. Divided and this application Nov. 26, 1968, Ser. No. 791,834
Int. Cl. C07c 147/00
U.S. Cl. 252—182                     3 Claims

ABSTRACT OF THE DISCLOSURE

Process for preparing a stable solution of dimethyl sulfoxide in liquid hydyrogen fluoride.

This is a division of application Ser. No. 578,518, filed on Sept. 12, 1966, now U.S. Patent No. 3,471,512.

This invention relates to processes for converting amino groups to fluoro groups. More particularly, it is concerned with a method of converting aminophenyl compounds to the corresponding fluorophenyl compounds. Specifically, it is concerned with a method for converting a 2-(aminophenyl)-4(5)-nitroimidazole to the corresponding 2-(fluorophenyl)-4(5)-nitroimidazole.

The 2-fluorophenyl-5-nitroimidazoles having an alkyl or hydroxyalkyl substituent in the 1-position have antiparasitic activity and are particularly useful in the treatment of protozoan-caused diseases. Thus, they are effective in the treatment of a poultry disease known as histomoniasis, which is due to a protozoan parasite *Histomonas meleagridis*. This disease, also known as turkey blackhead or enterohepatitis, is a serious economic problem in the turkey raising industry. In adition, the nitroimidazole compounds are active against *T. vaginalis* and are therefore useful in the treatment of vaginal infections due to this protozoan parasite.

One process for the preparation of these 2-(fluorophenyl)-5-nitroimidazoles involves halogenating the corresponding 2 - aminophenyl compound. The 2 - fluorophenyl compound can then be reacted to introduce the 1-alkyl or 1-hydroxyalkyl substituent to produce the desired 1-substituted-2-halophenyl-5-nitroimidazole.

Processes for converting aminophenyl compounds to the corresponding fluorophenyl compounds are known to the art. Thus it might be expected that a variation of the Sandmeyer reaction described in the literature (see Houben-Weyl, Methoden der Organischen Chemie, Fourth Ed., vol. 5/3, p. 213) would serve for this conversion. This prior art process involves dissolving the aromatic amine in liquid hydrogen fluoride, adding $NaNO_2$, then aging the solution at room temperature for about one day. The aromatic fluoride thus formed may then be isolated and recovered. However, this process is not of general applicability. Many aromatic amines can not be converted to the corresponding fluorides by this technique [see J. Chem. Soc., vol. 72, p. 4809 (1950)]. In particular this process is inapplicable to conversion of 2-(aminophenyl)-4(5)-nitroimidazole to the corresponding 2-(fluorophenyl) - 4(5) - nitroimidazole. When the 2-(aminophenyl)-4(5) - nitroimidazole is dissolved in liquid hydrogen fluoride and sodium nitrite added, allowing the reaction mixture to stand at room temperature for up to three days fails to produce the desired fluorophenyl product. Careful efforts to isolate the desired reaction product from the so aged reaction mixture has resulted only in recovery of some brick-red crystals, they turned out to be a diasonium salt. Therefore, other methods have been sought to effect the desired conversion.

It is an object of this invention to provide an improved process for converting aminophenyl compounds to fluorophenyl compounds.

A further object of this invention is to provide a novel hydrogen fluoride containing reaction medium.

Another object of this invention is to provide an improved method for converting 2 - (aminophenyl)-4(5)-nitroimidazole to 2-(fluorophenyl)-4(5) - nitroimidazole in good yields.

Other objects will be apparent from the detailed description of this invention herein after provided.

In accordance with this invention it has now been found that aminophenyl compounds can be converted to the corresponding fluorophenyl compounds by carrying out the reaction with sodium nitrite in a mixture of liquid hydrogen fluoride and dimethyl sulfoxide at elevated temperatures. Thus this method may be employed to convert 2-(aminophenyl)-4(5)-nitroimidazole to 2-(fluorophenyl)-4(5)-nitroimidazole. In carrying out the conversion in accordance with the present procedure, the aminophenyl compound is first dissolved in a mixture of liquid hydrogen fluoride and dimethyl sulfoxide. The hydrogen fluoride content is in substantial excess, i.e. 10–100 times, of the stoichiometric requirements, for the fluorination. Then the stoichiometric quantity of $NaNO_2$ is added while maintaining the mixture chilled. Thereafter, the reaction mixture is heated to the elevated reaction temperature, 50° S.–110° C. being the preferred range and maintained at this level until the reaction has been completed. Since nitrogen is evolved by the reaction, a diminution then cessation of gas evolution evidence completion of the reaction. The fluorophenyl compound product is then recovered from the resulting reaction mixture.

Thus when 2-(aminophenyl)-4(5) - nitroimidazole is converted to 2-(fluorophenyl)-4(5)-nitroimidazole, the reaction mixture is cooled, then poured into an excess of water which causes precipitation of the product which is then recovered from the aqueous mixture.

Surprisingly it has been found that even small amounts of dimethyl sulfoxide (DMSO) dissolved in liquid hydrogen fluoride (HF) serves to raise the boiling point of the hydrogen fluoride. For example equal parts by weight of DMSO and HF can be heated in an open container to 80° C.–90° C. without any substantial loss of HF. Liquid HF alone boils at 19° C. Perhaps equally surprising is the high degree of chemical stability exhibited by the mixture. DMSO reacts vigorously with the other halides, i.e. HCl, HBr, HI. In this high degree of stability the HF-DMSO solvent system appears unique.

The HF-DMSO solutions contemplated herein may contain from 5–80% by weight of DMSO; it can be utilized in many reaction systems as a substitute for liquid hydrogen fluoride offering an important advantage over liquid hydrogen fluoride in that the mixture permits use of open reactors with reaction temperatures substantially elevated above the boiling point of liquid HF. Normally, reactions involving liquid HF must be run in autoclaves or other pressure equipment when reaction temperatures exceed 19° C. Substituting a mixture of HF-DMSO for the liquid HF allows use of non-pressure equipment.

When converting aminophenyl compounds to fluorophenyl compounds according to practice of this invention the course of the chemical reaction does not appear influenced by presene of the DMSO, which may be surprising considering the presence of several highly reactive materials like $NaNO_2$ aminophenyl compound, diazonium salts in the heated reaction mixture. For this reaction, however, the quantity of DMSO should be controled within a range of about 5:1–10:1 molar ratio of HF:DMSO for best results.

The following example illustrates methods of carrying out the improved process.

Into 60 ml. (60 g.) of liquid HF (prepared by condensing HF gas in a polyethylene bottle, cooled in ice or Dry Ice-acetone), 30 ml. (30 g.) of DMSO is added in portions, while cooling and stirring in a carbon dioxide-acetone bath. Since considerable heat is generated, the addition should be done carefully. During this and the subsequent operations, a slow stream of dry nitrogen gas is kept going through the system to prevent absorption of moisture. The clear solution thus obtained may be stored at room temperature in a well-stoppered polyethylene bottle. The mixture consists of 3 g. mole of HF and 0.423 g. mole of DMSO (a 7:1 mole ratio HF to DMSO).

Sixteen ml. of the above prepared HF-DMSO mixture (containing about 0.53 mole of HF and 0.07 mole of DMSO) is charged into a KEL-F reactor. Then, while stirring the mixture and cooling with an ice bath, 4.08 g. of 2-(p-aminophenyl)-4(5)-nitroimidazole (0.02 mole) is added, followed by 1.38 g. (0.02 mole) of $NaNO_2$, added in stages over a several minute interval. A light colored, clear solution results.

The reactor is then immersed in an oil bath, kept at 100° and held there for one hour, with the reaction mixture being stirred. After about 10-15 minutes, vigorous gas evolution ensues, indicative of decomposition of a diazonium compound and release of gaseous nitrogen. The gas evolution subsides after about 30-40 minutes of heating and it is practically nil at the end of the heating period. A darker, but still clear, solution results. This reaction mixture is cooled to 30° C. then quenched by pouring it into 200 ml. of water. After aging in ice water, the precipitate is filtered, washed with water until neutral (pH 5) and dried in vacuo until constant weight, to give 3.70 g. of yellow product, M.P. 214–215°.

The same procedure is equally effective for conversion of the 2-(o-aminophenyl) and the 2-(m-aminophenyl)-4(5)-nitroimidazole to 2-(o-fluorophenyl) - 4(5) - nitroimidazole and 2-(m-fluorophenyl)-4(5)-nitroimidazole respectively.

What is claimed is:

1. A process for preparing a stable solution of dimethyl sulfoxide in liquid hydrogen fluoride which comprises adding dimethyl sulfoxide in controlled portions to liquid hydrogen fluoride in a cooling bath to absorb generated exothermic heat under a stream of inert gas which prevents the absorption of moisture.

2. A stable reactive mixture prepared by the process of claim 1 essentially consisting of a solution of dimethyl sulfoxide with hydrogen fluoride containing about 5–80% by weight of dimethyl sulfoxide therein.

3. The reactive mixture of claim 2 wherein the mole ratio of hydrogen fluoride to dimethyl sulfoxide is in the range of about 5:1 to 10:1.

References Cited

Dimethyl Sulfoxide (DMSO) Technical Bulletin, Crown Zellerbach Corp., Chemical Products Division, Camas, Wash., May 1964, p. 16.

RICHARD D. LOVERING, Primary Examiner

I. GLUCK, Assistant Examiner

U.S. Cl. X.R.

260—607